US008560379B2

(12) United States Patent
Forman et al.

(10) Patent No.: US 8,560,379 B2
(45) Date of Patent: Oct. 15, 2013

(54) ESTIMATING THE COST OF OWNERSHIP OF A SOFTWARE PRODUCT THROUGH THE GENERATION OF A COST OF SOFTWARE FAILURE FACTOR BASED UPON A STANDARD QUALITY LEVEL OF A PROPOSED SUPPLIER OF THE SOFTWARE PRODUCT

(75) Inventors: Ira R. Forman, Austin, TX (US);
Charles Gorham Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3312 days.

(21) Appl. No.: 10/636,990

(22) Filed: Aug. 7, 2003

(65) Prior Publication Data
US 2005/0033629 A1 Feb. 10, 2005

(51) Int. Cl.
*G06Q 10/00* (2012.01)

(52) U.S. Cl.
USPC ........ 705/7.41; 705/7.38; 705/7.39; 705/7.11

(58) Field of Classification Search
USPC .............................. 705/7.11, 7.38, 7.39, 7.41
See application file for complete search history.

(56) References Cited

U.S. PATENT DOCUMENTS

| 5,765,138 | A * | 6/1998 | Aycock et al. ..................... 705/7 |
| 6,629,126 | B1 * | 9/2003 | Schantz et al. ................. 709/201 |
| 6,647,374 | B2 * | 11/2003 | Kansal ............................. 705/37 |
| 7,284,274 | B1 * | 10/2007 | Walls et al. ..................... 726/25 |
| 2002/0147620 | A1 * | 10/2002 | Walsh ............................... 705/7 |
| 2003/0188290 | A1 * | 10/2003 | Corral ........................... 717/101 |
| 2004/0015377 | A1 * | 1/2004 | Hostetler ......................... 705/7 |
| 2004/0098299 | A1 * | 5/2004 | Ligon et al. .................... 705/10 |

OTHER PUBLICATIONS

Wilke, Lawrence, Software Costs Modern Office Procedures, Aug. 1973, vol. 18. No. 8, Abstract.*
Paulk, Mark C. et al., The Capability Maturity Model for Sdftware CMU/SEI Technical Report, CMY/SEI-93-TR-24, 1993.*
Kaplan, Craig, Defect Prevention Saves Millions Quality, vol. 32, No. 10, Oct. 1993, pp. 51-52.*
Knox, Stephen T., Modeling the Cost of Software Quality Digital Technical Journal, vol. 5, No. 4, 1993.*
Williamson, Miryam, Overview: Quality Pays ComputerWorld, vol. 31, No. 33, Aug. 18, 1997, pp. 78-81.*

(Continued)

*Primary Examiner* — Scott L Jarrett
(74) *Attorney, Agent, or Firm* — J. B. Kraft; Steven L. Bennett

(57) ABSTRACT

An implementation for estimating the costs attributable to software failures brought on by defects, i.e. estimating that portion of the cost of owning software products that is attributable to potential damage to the software owner resulting from potential defects in the software provided by particular software suppliers. Calculating the cost of ownership of a software product obtained from a proposed supplier, including a cost of software failure factor that is estimated as follows: predetermining the quality level of an ideal supplier of the software product and then determining the deviation in quality level of the proposed software supplier from the ideal supplier level. Then, estimating the difference in product defect rate at the quality level of the proposed supplier from the defect rate of the ideal supplier, after which the cost to compensate for the damage resulting from each defect based upon the intended use of the software product is estimated. Finally, a cost of software failure factor for each unit of the software product obtained from the proposed supplier is calculated by multiplying said difference in defect rate by the cost to compensate for damage resulting from each defect.

9 Claims, 3 Drawing Sheets

(56) References Cited

OTHER PUBLICATIONS

Krasner, Herb, Using the Cost of Quality Approach for Software CrossTalk, Nov. 1998.*
Pham, Hoang et al., A Software Cost Model with Warranty and Risk Costs IEEE Transactions on Computers, vol. 48, No. 1, Jan. 1999, pp. 71-75.*
Chulani, Sunita, COQUALMO (Constructive Quality Model) A Software Defect Density Prediction Model Extract from Project Control for Software Quality, Kusters et al., Shaker Publishing, 1999.*
Trebmly Ara C., Software bugs cost billions annually National Underwriter, vol. 106, No. 31, Aug. 5, 2002.*
Westland, Chirstopher J., The Cost of Errors in Software Development: Evidence from Industry the Journal of Systems and Software, vol. 62, 2002, pp. 1-9.*
Hoffman, Thomas, TCO Flawed but useful Computerworld, vol. 36, No. 49, Dec. 2, 2002, p. 52.*
Berman, Oded et al., Optimization Models for Reliability of Modular Software Systems IEEE Transactions on Software Engineering, vol. 19, No. 11, Nov. 1993.*
Slaughter Sandra A. et al., Evaluating the Cost of Software Quality Communications of the ACM, vol. 41 No. 8, Aug. 1998.*
Helander, Mary E. et al., Planning Models for Software Reliability and Cost IEEE Transactions on Software Engineering, vol. 24, No. 6, Jun. 1998.*
Jung, Ho-Won et al., Optimization models for quality and cost of modular software systems European Journal of Operations Research, Vo.. 112, 1999.*
Zhao, Yuxiao et al., Decision Making for Make vs. Buy of Software Components Proc 2nd Conf on Computer Science and Systems Engineering in Linkoping (CCSSE'99), 1999.*
Jung, Ho-Won et al., Selecting Optimal COTS Products Considering Cost and Failure Rate ISSRE FastAbstract, 1999.*
Cavanaugh, Barbara et al., Add Decision Analysis to Your COTS Selection Process CroosTalk Apr. 2002.*
Sedigh-Ali, Sahra et al., Metrics an dMOdels for Cost and Quality of Component-Based Software Proceedings of the $6^{th}$ IEEE International Symposium on Object-Oriented Real-Time Distributed Computer, ISORC, 2003.*
Krasner, Using the Cost of Quality Approach for Software CrossTalk, Nov. 1998.*
Zhao et al., Decision Making for Make vs. Buy of Software Components Proceedins $2^{nd}$ Conference on Computer Science and Systems Engineering in Linoping, CCSSE'99, 1999.*
Westland, The cost of errors in software development—Evidence from Industry the Journal of Systems and Software, vol. 62, 2002.*
Knox, Stephen, Modeling the Cost of Software Quality Digital Technical Journal, vol. 5, No. 4, 1993.*

* cited by examiner

ESTIMATING THE COST OF OWNERSHIP OF A SOFTWARE PRODUCT THROUGH THE GENERATION OF A COST OF SOFTWARE FAILURE FACTOR BASED UPON A STANDARD QUALITY LEVEL OF A PROPOSED SUPPLIER OF THE SOFTWARE PRODUCT

TECHNICAL FIELD

The present invention relates to a method of, and a computer program for, doing business using an interactive computer controlled display system to estimate cost involved in the purchase and use of software program products based upon an estimated quality level of a proposed software supplier.

BACKGROUND OF RELATED ART

Over the past generation, businesses have been undergoing major changes in the ways that they conduct their business. One of the most dramatic trends has been in the reduction of employees, functions and facilities through the out-sourcing of virtually anything that can be out-sourced. This has made many businesses leaner and more competitive with significantly reduced staffs and facilities to be maintained. However, along with these advantages has come a loss in control of the performance of many functions, as well as a diminished ability to control the quality of the resulting products.

This diminished control on the part of the business developer of products has become most pronounced in the supplying of software or computer program products. Suppliers of software present major quality assurance problems to developers of computer systems who are potential purchasers. Over its first forty years, prior to the 1980's, the software development environment was one in which an individual or a small dedicated group willing to put in long hard hours could create "elegant" software or "killer applications" directed to and effective in one or more of the limited computer system environments existing at the time. Unlike hardware or industrial product development, the development of software did not require substantial investment in capital equipment and resources. Consequently, in the software product field, the business and consumer marketplace to which the software is directed has traditionally expected short development cycles from the time that a computer need and demand becomes apparent to the time that a commercial software product fulfilling the need becomes available.

Unfortunately, with the explosion of computer usage and the resulting wide diversity of computer systems that must be supported by, or at least not incompatible with, each newly developed computer software product, the development cycles have become very complex. Even when the software product development is an upgrade of an existing product, every addition, subtraction or modification of the program could have an insignificant or a profound effect on another operating system or application program that must be supported.

During the evolution of the software industries over the past two decades it has been evident that developing software will be combined in new, often unforeseen, ways; and, thus, there is an increased likelihood that the individual developments will drive system programs that must be supported into inoperable states for certain purposes or under certain conditions. This changed development environment has caused many traditional and responsible software development houses to take the time and make the effort to resolve all potential incompatibilities with all existing and standard software before the new developed software products were commercially released. Unfortunately, the computer industry landscape is littered with the "corpses" of such responsible longer development cycle software houses that lost out to newer software product entrepreneurs that rushed to the market, or to buyers with products that were less than complete.

Whether the customer of a software supplier is acquiring the software for specific internal needs or to be incorporated into broader products to be marketed by the customer, dysfunctional software products from even one supplier can derail an entire enterprise with profound marketing or economic effects. Accordingly, processes and systems do exist for assessing the quality levels of software suppliers. Copending U.S. patent application Ser. No. 09/710,920, Timothy A. Dietz et al., Business Method for Performing Qualifications of Software and Software Development Organizations, filed Nov. 9, 2000, and assigned to the same assignee of the present invention, provides an effective method for accessing the quality of software suppliers.

Unfortunately, because of the extensive need for software suppliers due to extensive business out-sourcing, together with the high turnover in reliable software suppliers, it may often be difficult for system developers to get software suppliers of known reliability to provide for their software requirements on the developer's schedules. Consequently, it may often be the case that the software supplier may be less than the best available supplier or may be of relatively unknown quality.

It is not enough that the software supplier provide the customer with financial guarantees as to quality and schedules. The suppliers often will not have the resources to make up for the substantial losses that may result from defective software.

In view of the above circumstances, purchasers from software suppliers have been in need of processes for assuring or at least factoring the qualifications and reliability of such suppliers into their profitability pictures. Accordingly, the software industry has, over the past decade, been developing standards by which suppliers of software products may be evaluated. The Carnegie Mellon University has been foremost in such developmental activities through its Software Engineering Institute (SEI) and has generated a Capability Maturity Model (CMM)™, which is now an industry standard for evaluating software suppliers. A basic description of this industry standard is described in the article, *Capability Maturity Model*, Version 1.1, authored by Mark C. Paulk et al. of Carnegie Mellon, appearing in *IEEE Software*, Vol. 10, No. 4, July 1993, pp. 18-27. The SEI-SW CMM rates software product supplier based upon five levels of maturity respectively accorded to the software suppliers based upon the development of the software organization. For example, at the lowest level, i.e. immature organization, there is no objective basis for judging product quality or for solving software product or process problems. Therefore, product quality is difficult to predict. Activities intended to enhance quality, such as phase reviews and testing, are often curtailed or eliminated when projects fall behind schedule. The immature (CMM-level 1) organization is reactionary. Thus, managers are continually focused on solving immediate crises. Schedules and budgets are routinely exceeded because they are not based on realistic estimates. Faced with deadlines, software product functionality and quality are often compromised to meet the schedule. Conversely, at the highest maturity level (CMM-level 5), for example, the organization has the organization-wide ability for managing software development and maintenance processes. The software process is accurately communicated to all of the staff and work activities are carried out according to the planned process. The processes mandated are consistently followed in getting the work done. Roles and responsibilities within the defined processes are clear throughout projects and across the organization. Managers monitor the quality of the software products. There is an objective quantitative basis for judging quality and analyzing problems in products or processes. Schedules and budgets are based on historical performance and are realistic. The expected results for cost, schedule, functionality and quality of the product are usually achieved. In general, a disciplined process is consistently followed because all of the participants understand and the necessary infrastructure exists to support the process. According to the SEI CMM, there are five standard levels of software process maturity that may be accorded to a software supplier: 1) initial level having the immature conditions described above; 2) processes are repeatable and disciplined; 3) standard well defined and consistent processing (this is defined as the industry standard or ideal level of maturity that serves as the benchmark against which the other levels are measured—a software supplier at this level typically produces software that has a defect density no greater than 1 defect/KSLOC (no greater than one defect per thousand lines of code); 4) Managed level software processes are quantifiable and consistently predictable, as well as being operable within well defined limits; and 5) the ultimate maturity level described above.

SUMMARY OF THE PRESENT INVENTION

While the above-described prior art provides an effective standard that helps the purchasers of software products to select suppliers suitable to the needs of the purchasers, it does not provide, in effect, an implementation for estimating that portion of the total cost of owning or using software caused by potential defects in the software; it does not involve a methodology for estimating that portion of the cost of owning software products that is attributable to potential damage to the software owner resulting from potential defects in the software provided by the particular supplier. The present invention offers such an implementation for estimating the costs attributable to software failures brought on by defects.

Accordingly, the invention operates in a computer controlled display environment where it provides a method and computer program for calculating the cost of ownership of a software product obtained from a proposed supplier including a cost of software failure factor that is estimated as follows: predetermining the quality level of an ideal supplier of said software product; and then determining the deviation in quality level of the proposed software supplier from said ideal supplier level. Then, estimating the difference in product defect rate at the quality level of the proposed supplier from the defect rate of the ideal supplier, after which the cost to compensate for the damage resulting from each defect based upon the intended use of said software product is estimated. Finally, a cost of software failure factor for each unit of said software product obtained from said proposed supplier is calculated by multiplying said difference in defect rate by the cost to compensate for damage resulting from each defect.

The resulting costs necessitated by this choice of supplier may be compared with the costs from a second proposed supplier by calculating the cost of failure factor for a second proposed supplier of the software product, determining the price per unit for the software product respectively charged by the original and the second suppliers and, then, comparing the differences in the respective cost of failure factors between said original and second suppliers with the differences in price per unit charged by said suppliers to thereby select a supplier. The quality levels of the suppliers may be determined using any of the above-described standards of the two copending patent applications or Software Engineering Institute Software—Capability Maturity Model (SEI SW-CMM). It should be noted that there may be circumstances where the quality level of the software supplier may be such that the software failure factor may be infinitely high because of the resulting damages. The cost of software factor for said proposed supplier may be added to the total of all other costs for producing each unit of the software by the proposed supplier to thereby provide the total cost of ownership for each unit provided by said proposed supplier. This cost of ownership may be calculated by a proposed supplier in order to determine a sales price to a purchaser, or this cost of ownership may be calculated by a purchaser from the proposed supplier in order to determine the cost of ownership beyond the sales price to the purchaser.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
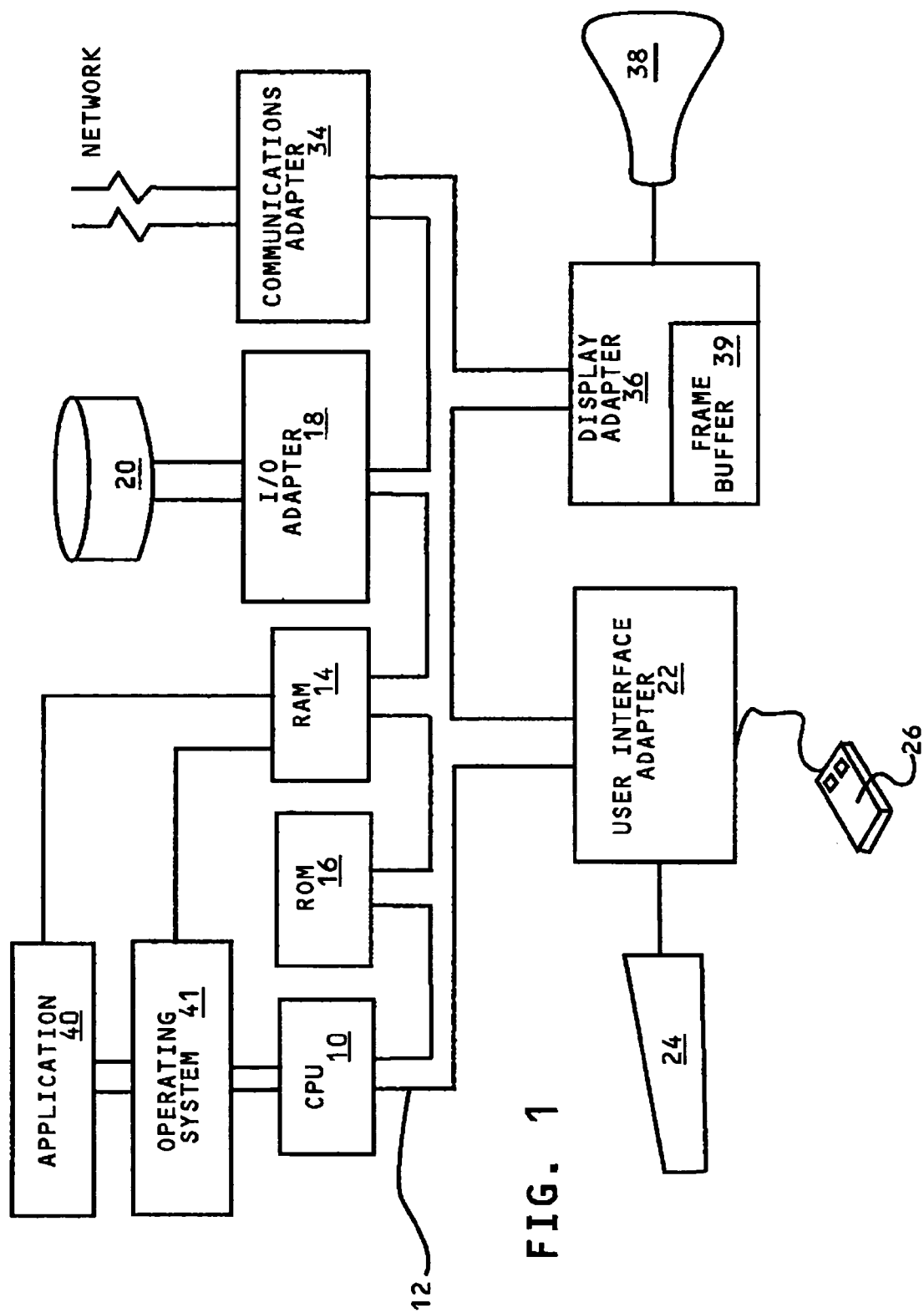
FIG. 1 is a block diagram of a data processing system including a central processing unit and network connections via a communications adapter that is capable of functioning as an interactive user's computer controlled display on which the display system of the present invention may be used to interactively enter and read data in determining the cost of failure factors and cost of software ownership.

Referring to FIG. 1, a typical data processing terminal is shown that may function as the computer controlled display for interactively entering and reading data in the practice of this invention to determining the cost of failure factors and cost of software ownership. A central processing unit (CPU) 10, such as one of the PC microprocessors or workstations, e.g. eServer pSeries available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsMe™ or Windows 2000™, as well as UNIX and other IBM operating systems. Application programs 40, controlled by the system, are moved into and out of the main memory Random Access Memory (RAM) 14. These programs include the program of the present invention for the determination of the cost of software failure factors and the resultant cost of ownership. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for generating contract requirements.

Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
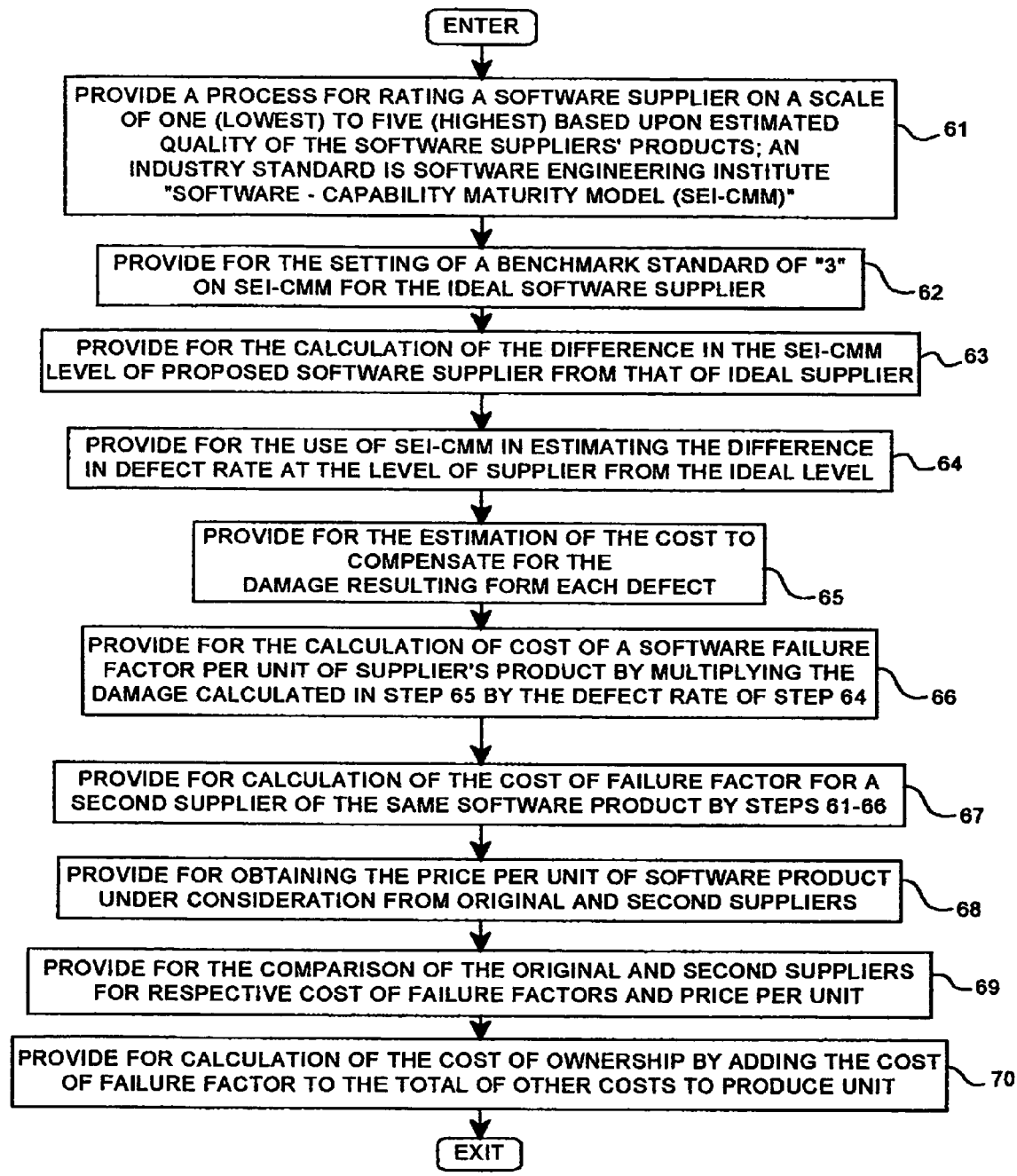
FIG. 2 is an illustrative flowchart describing the setting up of the process of the present invention for determining the cost of failure factors and the resulting cost of software ownership.

With reference to the flowchart of FIG. 2, there will be described an illustrative process of how the process of the present invention is set up. A process is provided, step 61, for rating of a software supplier based upon resources, reliability and consistency of results. There are several such processes available in the current art for such supplier evaluations. By way of illustration, copending U.S. patent application Ser. No. 09/710,920, Timothy A. Dietz et al., Business Method for Performing Qualifications of Software and Software Development Organizations, filed Nov. 9, 2000, and assigned to the same assignee of the present invention, provides an effective method for accessing the quality of software suppliers. Likewise, copending U.S. patent application Ser. No. 09/935,413, Method, Apparatus and Computer Program Product for Technology Comparisons, filed Aug. 23, 2001, involving inventors common with those of the present Application and assigned to a common assignee, may also be used. The invention is not limited to how the software supplier is evaluated, but rather is based on the use of the supplier's quality rating to develop cost of software failure factors and the resultant costs of ownership. For purposes of illustration, the *Capability Maturity Model. Version* 1.1, described above as an industry standard will be used and referred to as SEI-CMM. In this connection, it is to be noted that SEI-CMM uses maturity of the supplier's organization as primarily determinative of quality level. This is certainly a valid approach. However, there are many other criteria that may be used to determine supplier quality levels as described above in the two listed copending patent applications. Next, step 62, a standard is set forth what would be an ideal supplier; a level of "3" SEI-CMM is found to be such a benchmark. This need not be the near perfection level of "5" but suitable as an ideal for the purposes of the present illustration. Of course, what is selected as the ideal level for any software supplier would be based upon the damages that could result from a failure. These may go beyond monetary costs. If the supplier has provided software for a manned space application, the ideal level could be a "4" or a "5" as the cost factor in such a case would be infinitely high.

Provision is made for calculating the difference in level from the level accorded to the proposed supplier from the ideal level, step 63. Provision is made for the use of the SEI-CMM standard parameters to determine the difference in estimated defect rates based upon the deviation of the supplier's quality level from the ideal, step 64. To illustrate: the SEI-CMM standard was influential in the estimation that a level "3" should have a defect rate of no greater than 1/KSLOC, i.e. one defect per thousand lines of code. This a very satisfactory ideal for most commercial use software. On the other hand, for space mission critical code, the defect rate should be no greater than 0.1/KSLOC. In any event, since this illustration is of a supplier of commercial code the deviation from an ideal "3" level is used. The SEI-CMM provides the protocols for estimating the cost to compensate for damage for each defect. For purposes of this illustration, let us use a reasonable industry standard of $10,000 ($10K) per defect for the commercial software product. Thus, step 66, if the supplier is rated at a level "2", which is estimated at 1.2 defects/KSLOC, then there is a deviation of 0.2 defects/KSLOC. For a software product with ten thousand lines of code, this would calculate to two additional defects from the ideal for each software program unit provided by the supplier or a cost of software failure of $20,000 per each software program product purchased from the supplier. The purchaser could then add this $20,000 to the charge for each software program to determine the true cost of ownership.

This would permit the purchaser to make comparisons with other software suppliers. Provision is made, step 67, for the repetition of steps 61 through 66 for a second proposed supplier of the software product. This would make available, step 68, the price of ownership for the original and the second suppliers. The cost of ownership, as well as the cost of failure factor for each of the two proposed suppliers could be compared, steps 69 and 70, to choose the appropriate software supplier.

The cost of software failure factor and the cost of ownership would be available for the purchaser to negotiate for contractual protection beyond product price. When appropriate, the purchaser may request terms that protect the purchaser and the purchaser's end users from liabilities even beyond monetary liabilities.

In the illustration, the description has been from the viewpoint of what a purchaser may factor in when determining cost of ownership with respect to software developed or customized for the particular purchaser. However, the invention may also be effectively used by software vendors developing software program products to be sold off-the-shelf to the public. In such a case, the vendor's cost of ownership would factor into the potential costs due to estimated failures. The vendor could use this cost of ownership to determine the sale price to insure his profit.

Figure 3:
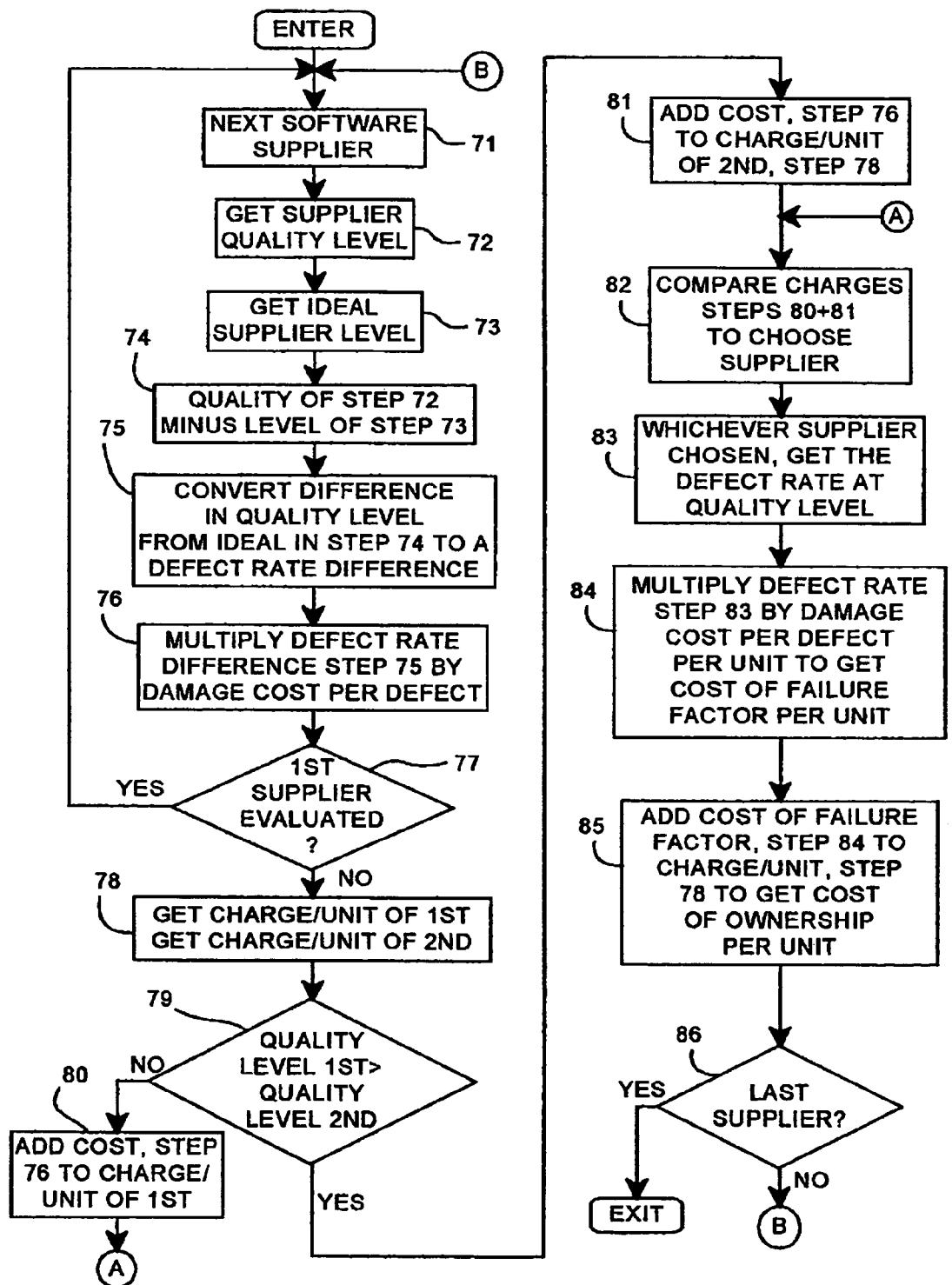
FIG. 3 is a flowchart of an illustrative run of the process setup in FIG. 2.

With respect to FIG. 3, there will now be described a running of the process set up in FIG. 2. To initiate the program, data on the initial or next software supplier under consideration is obtained, step 71. The quality level of the supplier under study is obtained, step 72, and the benchmark "ideal" quality level is also obtained, step 73. The deviation of the quality level of the supplier from the "ideal" is then determined, step 74. Using tables or listings relating defect rates to each of the various quality levels, the deviation or difference of level from the ideal is converted to a difference of defect rate, step 75. The defect rate difference determined in step 75 is multiplied by the damage cost per defect to get the cost of software failure factor for this supplier, step 76. Then a determination is made as to whether this is the first supplier being evaluated, step 77. If Yes, then the process is returned to step 71 and the evaluation of the next proposed supplier is commenced. If No, then there already is another supplier evaluation to which the instant supplier evaluation may be compared. Thus, step 78, the charge for each program or software unit is obtained for the first and second supplier. Then, step 79, the quality levels of the first and second vendors are compared. If it is determined that the quality level of the first supplier is better than the quality level of the second, then, step 81, the cost of failure factor as determined in step 76 is added to the per unit charge of the second supplier of step 78. Alternately, if it is determined that the quality level of the second supplier is better than the quality level of the first supplier, then, step 80, the cost of failure factor as determined in step 76 is added to the per unit charge of the second supplier of step 78. The process then branches via "A" to step 82. Likewise, step 82 follows step 81. The charges developed in steps 80 and 81 are, thus, compared in step 82 and rated to select a supplier. In any event, irrespective of the technique used to determine the supplier levels for the selected supplier, determine the defect rate at the supplier's quality level, step 83. Then, step 84, this defect rate is multiplied by the estimated damage cost per defect per unit to calculate the Cost of Failure Factor per unit. In a final step, 85, the cost of failure factor of step 84 is added to the sales price per unit as set forth in step 78 to get the cost of ownership per unit. At this point, a determination is made as to whether the last software supplier has been evaluated, step 86. If Yes, the session is exited. If No, the process branches back to initial step 71 via branch "B".

Although certain preferred embodiments have been shown and described, it will be understood that many changes and modifications may be made therein without departing from the scope and intent of the appended claims.

What is claimed is:

1. A computer usable medium having stored thereon, a computer program for calculating the cost of ownership of a software product obtained from a first proposed supplier including a cost of software failure factor estimation, wherein the computer program when executed on a computer causes the computer to:
    predetermine the quality level of an ideal supplier of said software product;
    determine deviation in quality level of said first proposed software supplier from said ideal supplier level;
    estimate the difference in product defect rate at the quality level of the first proposed supplier from the defect rate of said ideal supplier;
    estimate the cost to compensate for a damage resulting from each defect based upon the intended use of said software product;
    determine a cost of software failure factor for each unit of said software product obtained from said first proposed supplier by multiplying said difference in defect rate by said cost to compensate for damage resulting from each defect;
    calculate the cost of failure factor for a second proposed supplier of said software product;
    determine the price per unit for said software product respectively charged by said first proposed and said second proposed suppliers; and
    select a supplier by comparing the differences in said cost of failure factors between said first proposed and second proposed suppliers with differences in price per unit charged by said suppliers.

2. The computer usable medium of claim 1, wherein the quality levels are determined under the standards of the Software Engineering Institute Software—Capability Maturity Model (SEI SW-CMM).

3. The computer usable medium of claim 1, wherein a proposed supplier has a quality level at which the cost of software failure factor for a proposed supplier is infinitely high, and the computer program when executed disqualifies the supplier in response to said quality level.

4. The computer usable medium of claim 3, wherein said cost of software failure factor for a proposed supplier is infinitely high based upon damages resulting from the intended use of said software product.

5. The computer usable medium of claim 3, wherein said cost of software failure factor for a proposed supplier is the cost of failure factor of an ideal supplier in order for the computer program when executed not to disqualify the proposed supplier in response to said quality level.

6. The computer usable medium of claim 3, wherein the quality level of said ideal supplier is an SEI SW-CMM quality level of "3" and a proposed supplier has an SEI SW-CMM quality level of "1".

7. The computer usable medium of claim 3, wherein the computer program when executed further causes the computer to determine the total cost of ownership for each unit provided by a proposed supplier by adding said cost of the software failure factor for said proposed supplier to a total of all other costs for producing each unit of said software by said proposed supplier.

8. The computer usable medium of claim 3, wherein the computer program when executed calculates said cost of ownership by a proposed supplier, and said supplier determines a sales price to a purchaser based upon said calculated cost of ownership.

9. The computer usable medium of claim 3, wherein said computer program when executed calculates said cost of ownership for a purchaser from a proposed supplier and said purchaser determines the cost of ownership beyond the sales price to said purchaser.

* * * * *